H. KORRODI & O. GRAUHERING.
PRISM TELESCOPE.
APPLICATION FILED APR. 30, 1907.
988,642.
Patented Apr. 4, 1911.
2 SHEETS—SHEET 1.
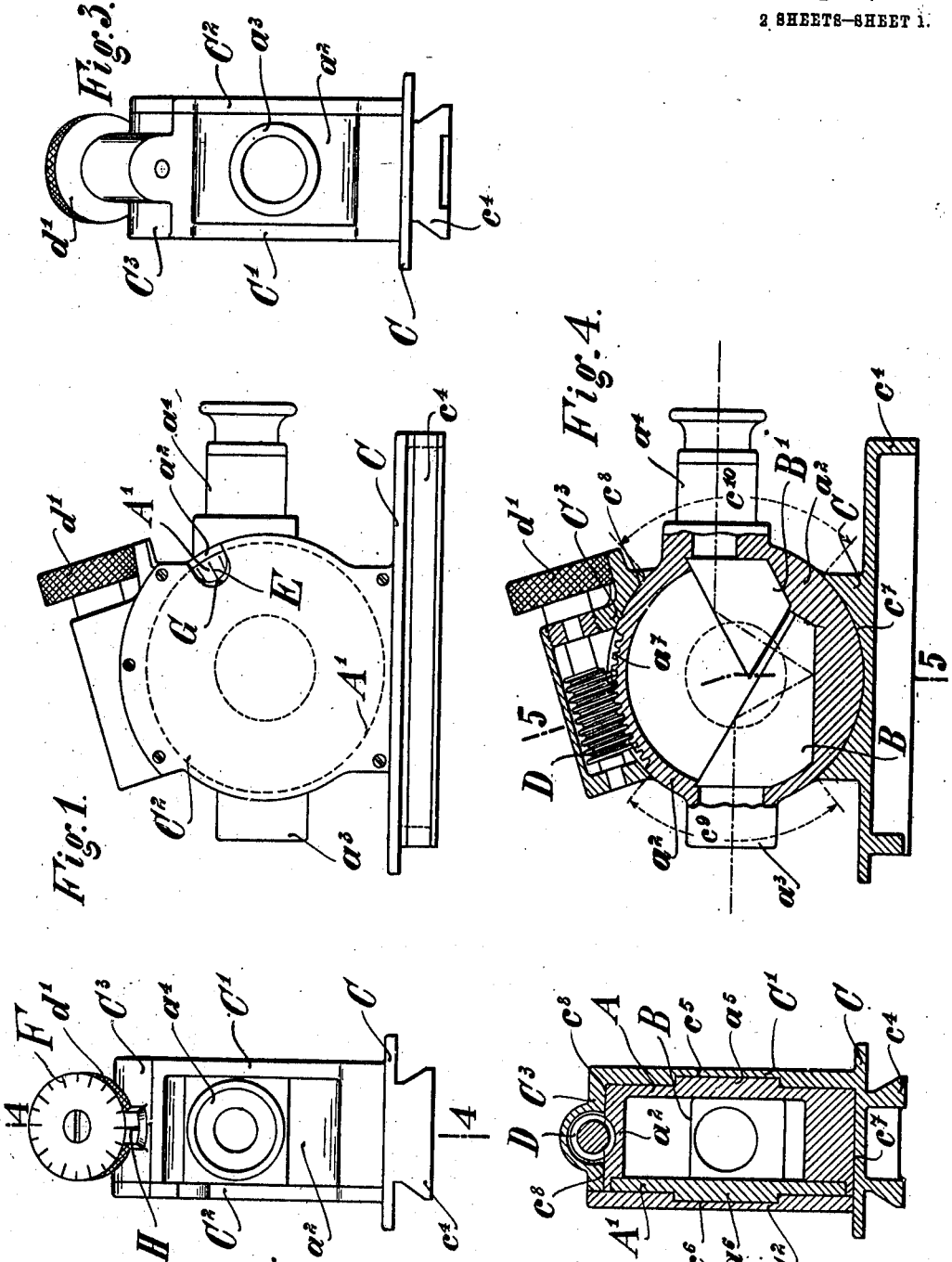

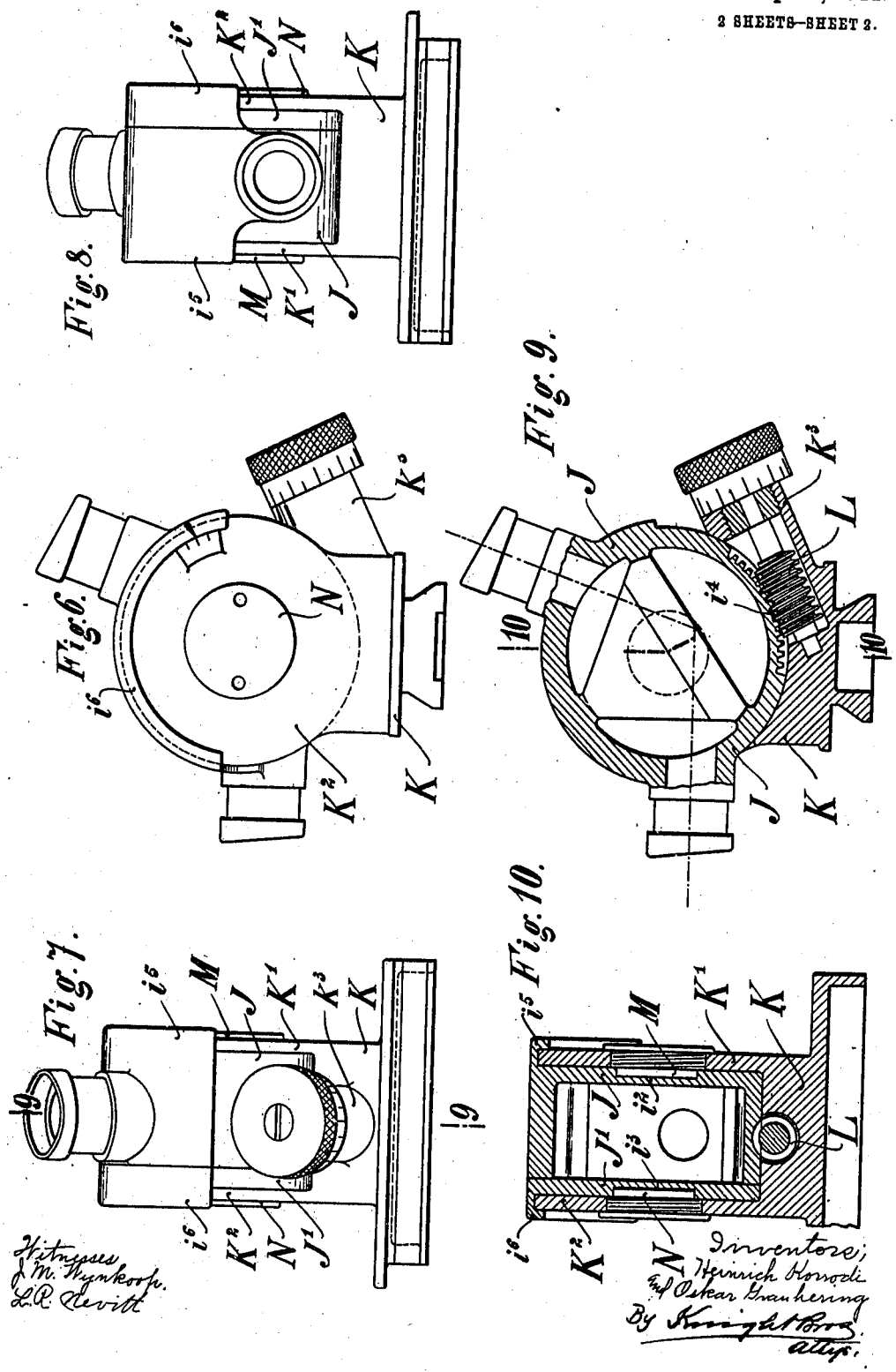

UNITED STATES PATENT OFFICE.

HEINRICH KORRODI AND OSKAR GRAUHERING, OF ESSEN-ON-THE-RUHR, GERMANY, ASSIGNORS TO FRIED. KRUPP AKTIENGESELLSCHAFT, OF ESSEN-ON-THE-RUHR, GERMANY.

PRISM-TELESCOPE.

988,642.   Specification of Letters Patent.   Patented Apr. 4, 1911.

Application filed April 30, 1907. Serial No. 371,074.

*To all whom it may concern:*

Be it known that we, HEINRICH KORRODI and OSKAR GRAUHERING, residing at Essen-on-the-Ruhr, Germany, both subjects of the Emperor of Germany, have invented a certain new and useful Improvement in Prism-Telescopes, of which the following is a specification.

The present invention relates to that type of swingingly mounted prism telescopes with cylindrical prism-chamber in which the optical axis passes through the wall of the prism-chamber and the swinging axis of the telescope coincides with the axis of the prism-chamber.

The main object of the invention is to make telescopes of this type adapted for use as gun-sights.

In the accompanying drawings—Figure 1 is a side view of one embodiment of the invention: Fig. 2 is an end view looking from the right; Fig. 3 is an end view looking from the left; Fig. 4 is a section on line 4—4, Fig. 2; Fig. 5 is a section on line 5—5, Fig. 4, looking from the right; Fig. 6 is a side view of another embodiment of the invention; Fig. 7 is an end view of the same looking from the right; Fig. 8 is an end view of the same looking from the left; Fig. 9 is a section on line 9—9, Fig. 7; and Fig. 10 is a section on line 10—10, Fig. 9, looking from the right.

Reference will first be had to the embodiment shown in Figs. 1 to 5. The chamber which serves to hold the prisms B B' is in the form of a flat cylinder which consists of a box or casing A and a cover plate A', tightly closing the hollow space of the box. The casing $a^2$ of the prism chamber is provided with two tubular projections $a^3$ $a^4$, one of which ($a^3$) serves as the objective-carrier, while the other ($a^4$) serves as the eye-piece carrier. The optical axis of the telescope, therefore, passes through the casing of the prism-chamber. The telescope is swingingly supported in a mount by means of two trunnions $a^5$ $a^6$ (Fig. 5) journaled in the side walls C' C² of the housing or mount. The axis of the trunnions $a^5$ $a^6$ coincides with the axis of the prism chamber and is perpendicular to the plane through the optical axis of the telescope. The mount is provided with a foot C, two cheeks C' C² and a bridge C³. The foot C is provided with a dovetail base $c^4$, which serves for securing the mount in the head of a sight-post or the like. The foot C is integral with the cheek C' and the bridge C³ while the cheek C² is a separate piece and is secured to the bridge C³ and foot C by means of screws. Due to this arrangement the telescope can be withdrawn sidewise from the mount when the cheek C² is removed. The cheeks C' C² are provided with bearings $c^5$ $c^6$ for the trunnions $a^5$ $a^6$ and completely cover the sides of the prism chamber A A'. The foot C and the bridge C³ of the telescope-mount each have a cylindrical surface $c^7$ and $c^8$ which lies against the casing $a^2$ of the prism chamber. The telescope mount consequently forms a housing which is entirely closed with the exception of the openings $c^9$ $c^{10}$ (Fig. 4) provided for the passage for the objective-carrier $a^3$ and the eye-piece carrier $a^4$. The bridge C³ of the telescope mount is formed to provide a housing for a worm D which can be rotated by means of a hand-wheel $d'$ and which meshes with a toothed portion $a^7$ (Fig. 4) of the prism chamber. The gear D $a^7$, which serves to adjust the telescope, is consequently arranged in such a manner that the prism chamber is journaled on both sides of the gear by means of the trunnions $a^5$ $a^6$. An indicating device, the arrangement of which can be seen in the drawing and which consists of a main-scale E (Fig. 1), a sub-scale F (Fig. 2) and the corresponding marks G H, serves to determine the angle through which the telescope is swung relatively to its mount. When the above-described device is used in connection with a gun sight-post or the like, it can, by adjusting the telescope relatively to the mount, serve for taking aim at auxiliary targets, for measuring terrain angles and for regulating the position of bursting points. As the prism chamber A A' forms a housing, which is entirely closed, its interior will be dust-proof. On the other hand the above-described mounting of the telescope sufficiently prevents the turning axis of the telescope from changing its position. As is well known, the shocks, to which a telescope as a gun-sight is subjected during travel and during firing, tend to effect such changes in the position of the turning axis of the telescope. Furthermore jamming action in the bearings is prevented because the journals of the prism chamber are located on both sides of the gear D $a^7$.

In the embodiment of the invention shown in Figs. 6 to 10, the sight-telescope is constructed to view from above, that is to say, the axis of the eye-piece is inclined upwardly. Furthermore, this embodiment differs from the first embodiment mainly in the following respects: Both telescope-mount cheeks K' K², which cover the side faces of the prism-chamber J J', are integral with the foot K (see in particular Fig. 10). The bridge, which in the first embodiment connects the cheeks of the mount, is not present in the second embodiment. The trunnions M N for the telescope are screwed into the cheeks K' K² of the mount and engage in bores $i^2$ $i^3$ (Fig. 10) in the prism chamber J J'. The upper part of the prism chamber is provided with two arcuate projections $i^5$, $i^6$ which extend concentrically to the axis of the trunnions M N and overlap the edge of the cheeks K' K². By reason of this arrangement the telescope can be withdrawn upwardly from the mount when the trunnions M N are brought out of engagement with the bores $i^2$ $i^3$. The worm L for adjusting the telescope is journaled in the foot K of the mount and in a housing $k^3$ mounted on the foot. The worm meshes with a toothed portion $i^4$ of the prism chamber J J'. It is evident that this embodiment presents the same advantages as the first-described embodiment.

Having thus described our invention, what we claim and desire to secure by Letters Patent is:

1. A prism telescope for gun-sights comprising a housing having flat side walls, and a casing therein having a cylindrical prism-chamber, said casing being swingingly mounted on trunnions within said housing about an axis coinciding with the axis of said cylindrical prism-chamber, and said housing being constructed to permit of the casing being moved into and out of said housing.

2. A swingingly mounted prism-telescope for gun-sights comprising a cylindrical housing having flat side walls with concentric circular depressions therein; a closed cylindrical prism-chamber provided with trunnions to correspond with the depressions in the flat walls of the housing; and means whereby said prism chamber can be moved axially into and out of said housing.

3. In a prism telescope for gun-sights; a carrier comprising a cylindrical housing with flat side walls, one of said side walls being removable axially; and a closed prism-chamber rotatably mounted in recesses in said flat walls whereby said prism-chamber is adapted to be rotated about the axis of said cylindrical housing.

4. In a prism telescope for gun-sights, the combination with a closed circular prism-chamber having flat side walls provided with integral trunnions concentric with said circular chamber; of a carrier for said prism-chamber, said carrier comprising a cylindrical housing having flat side walls with concentric depressions therein to receive said trunnions; a bridge above said prism-chamber, means mounted within said bridge for rotating said prism-chamber, and a base, said base and bridge being integrally formed with one of the flat side walls and the other side wall being removable to allow the prism-chamber to be moved axially into and out of said housing.

5. A prism-telescope for gun-sights, comprising a cylindrical prism-chamber provided with a removable side wall; and a cylindrical housing for said prism-chamber having flat side walls within which the prism-chamber is trunnioned, the flat wall of the housing adjacent to the removable side wall of the prism-chamber being removably secured to said housing.

6. The combination with a closed cylindrical prism-chamber having one integral and one removable side wall; of a housing therefor also having one integral and one removable side wall, the side walls of the prism-chamber being journaled within the side walls of the housing and said removable side walls lying adjacent to each other.

7. In a prism-telescope, the combination with the toothed cylindrical prism-chamber having an integral and a removable side wall, both of said side walls being provided with trunnions co-axial with said prism-chamber and perpendicular to the optical axis of the telescope; of a mount for said prism-chamber, said mount comprising an engaging foot, a bridge above said foot, a flat recessed side wall for integrally connecting said bridge with said foot, and a removable recessed side wall for retaining the prism-chamber within said housing; and a worm mounted in said bridge for engaging the toothed portion of said prism chamber, the integral and removable side walls of said prism-chamber being trunnioned in the integral and removable walls respectively of said housing.

8. A swingingly mounted prism telescope for gun-sights comprising a cylindrical housing having flat side walls; a closed cylindrical prism-chamber trunnioned within the flat walls of the housing; and means removable axially of said trunnions whereby said prism chamber is freed to be moved into and out of said housing.

9. In a prism telescope for gun-sights, the combination with a closed circular prism-chamber having flat side walls; of a carrier for said prism-chamber, said carrier comprising a cylindrical housing having flat side walls within which said prism-chamber is trunnioned concentrically with the prism-chamber; means mounted within said housing for rotating said prism-chamber; a base integrally formed with said housing; and means removable axially of the prism-chamber whereby said prism-chamber is permitted to be moved into and out of position within the housing.

10. In a prism-telescope, the combination with a cylindrical prism-chamber having a toothed periphery; of a mount within which said prism-chamber is rotatably mounted upon trunnions coaxial with its own axis and perpendicular to the plane of the optical axis of the telescope, said mount comprising an engaging foot integral with said mount; a worm mounted in said mount and adapted to engage the toothed periphery of said prism-chamber; and means removable axially of the prism-chamber to permit the removal and replacement of said prism-chamber within its mount.

The foregoing specification signed at Dusseldorf, Germany, this 28th day of February, 1907.

HEINRICH KORRODI.
OSKAR GRAUHERING.

In presence of—
ALFRED POHLMEYER,
M. ENGELS.

Copies of this patent may be obtained for five cents each, by addressing the "Commissioner of Patents, Washington, D. C."